United States Patent [19]
Bentley et al.

[11] Patent Number: 5,537,404
[45] Date of Patent: Jul. 16, 1996

[54] SWITCHED CIRCUIT CONNECTION MANAGEMENT OVER PUBLIC DATA NETWORKS FOR WIDE AREA NETWORKS

[75] Inventors: Alan M. Bentley; Mark E. Fisher; Brian E. Jongekryg; Randall S. Nelson, all of Rochester, Minn.

[73] Assignee: International Business Machines Corporation, Armonk, N.Y.

[21] Appl. No.: 430,712

[22] Filed: Apr. 25, 1995

Related U.S. Application Data

[63] Continuation of Ser. No. 998,314, Dec. 29, 1992, abandoned.

[51] Int. Cl.⁶ .................................................. H04L 12/50
[52] U.S. Cl. ...................... 370/60.1; 370/80; 370/110.1; 370/68.1
[58] Field of Search ......................... 370/80, 85.6, 110.1, 370/60, 60.1, 94.1, 94.2, 85.13, 85.14, 81, 68.1

[56] References Cited

U.S. PATENT DOCUMENTS

| | | | |
|---|---|---|---|
| 3,836,719 | 9/1974 | Clark . | |
| 4,437,182 | 3/1984 | Lambert et al. . | |
| 4,528,659 | 7/1985 | Jones | 370/80 |
| 4,549,302 | 10/1985 | Heatherington | 375/8 |
| 4,654,656 | 3/1987 | Deaver et al. . | |
| 4,954,821 | 9/1990 | Gray et al. | 370/85.1 |
| 4,961,140 | 10/1990 | Pechanek et al. . | |
| 4,980,886 | 12/1990 | Bernstein | 370/80 |
| 4,989,204 | 1/1991 | Shimizu et al. . | |
| 4,996,685 | 2/1991 | Farese et al. | 370/110.1 |
| 4,999,836 | 3/1991 | Fujiwara | 370/110.1 |
| 5,021,950 | 6/1991 | Nishikawa . | |
| 5,027,346 | 6/1991 | Hoshi | 370/60 |
| 5,065,395 | 11/1991 | Shenoid et al. | 370/81 |
| 5,067,149 | 11/1991 | Schneid et al. . | |
| 5,072,441 | 12/1991 | Szwarc | 370/60 |

OTHER PUBLICATIONS

Uyless Black, OSI A Model For Computer Communications Standards, 1991, pp. 16–29.

*Primary Examiner*—Benedict V. Safourek
*Assistant Examiner*—Chau T. Nguyen
*Attorney, Agent, or Firm*—Andrew J. Dillon

[57] ABSTRACT

The invention relates to a wide area network implemented on a circuit-switched public data network. Terminals have access to a plurality of data channels and a control channel into the network using a balanced protocol. The invention provides a method for reducing connect time between the terminals over the data channels. To do this a conversation is established between a transaction program on the local terminal and a transaction program on the remote terminal. Responsive to generation of a frame for transmission by the transaction program on the local terminal to the transaction program on the remote terminal, a channel connection between the local terminal and a remote terminal including a data channel connecting each terminal into the wide area network is established if no channel connection already exists. Responsive to expiration of a predetermined period after last transmission or receipt of a frame and existence of the channel connection for a minimum connect period, the channel connection is disestablished without interrupting the conversation between the transaction programs. The predetermined period and the minimum connect period are optimized to minimize costs under a tariff structure for the circuit-switched public data network.

10 Claims, 8 Drawing Sheets

SWITCHED CIRCUIT CONNECTION MANAGEMENT OVER PUBLIC DATA NETWORKS FOR WIDE AREA NETWORKS

This is a continuation of application Ser. No. 07/998,314, filed 29 Dec. 1992, abandoned.

BACKGROUND OF THE INVENTION

1. Technical Field

The invention relates to data communications and more particularly to data communications over a wide area network implemented on a telecommunications system imposing tariffs. Still more particularly the invention relates to a method of minimizing connection costs between stations over the telecommunications system where the stations exhibit bursty or intermittent data transmission demands.

2. Description of the Related Art

Data communication over a public data network is facilitated by careful definition of the interface between terminal equipment, such as a user's personal computer, and the network. Such a definition is part of a protocol, a set of semantic and syntactic rules that determines the behavior of functional units in establishing communication between two terminals. A number of such protocols have been written which are usable with wide area networks. Among these protocols are the Open Systems Interconnection architecture (OSI), circuit switched X.25 and the System Network Architecture (SNA). While the present patent has general applicability to wide area networks implemented on public data networks, it is particularly applicable to a network service called the Integrated Services Digital Network (ISDN), which can be implemented with any of a number of protocols.

ISDN is a digital end-to-end telecommunication service that supports multiple services including, but not limited to, voice, interactive video and data. Among the data networks on which ISDN may be implemented is the telephone system in place in Canada and the United States as of the 1990's. This telephone system utilizes digital transmission channels between switching exchanges and analogue links between subscribers and those switching exchanges. Analogue to digital and digital to analogue conversion is provided at the switching exchanges. ISDN provides modification of the physical link between a terminal and the telephone central switching office so that it can support digital communication. With such a modification, the use of modems for linking computers over telephone lines can be eliminated. ISDN provides greatly increased data transmission rates, in part by cutting out the multiple conversions between digital and analogue representations of a signal occurring at the central switching office and in the modems collocated with the terminals. Communication is digital from terminal to terminal.

An ISDN interface uses the physical link to the telephone system central switching office to provide a subscriber a plurality of logical channels to the central switching office and through it to remote terminals. The channels are time division multiplexed logical channels. One logical channel, called the "D-channel", is between a terminal and control circuitry of the central switching office. The D-channel is used primarily for passing control information between the terminal and the local ISDN switch in the network. A plurality of logical "B-channels" are also available. These are used for end-to-end connections for data transmission between terminals. End-to-end connection is controlled by D-channel activity. Each B-channel carries data at rates up to 64 Kbits per second. With the ISDN basic rate two B-channels and one D-channel are available. With the ISDN primary rate, 23 or more B-channels are available.

In network architecture, a group of services that is complete from a conceptual point of view and that extends across all systems that conform to the network architecture is called a layer. As implied by the term layer, such groups are arranged hierarchically. In ISDN, stacks of layers are provided for each channel. For the D-channel there is the control protocol stack and for each B-channel in use there is a user protocol stack. The layers present in a user protocol stack depend upon the protocol in use. In other words, a terminal may belong to more than one network simultaneously. A typical hierarchy for a user protocol stack includes an application layer (layer 7), a presentation layer (layer 6), a session layer (layer 5), a transport layer (layer 4), a network layer (layer 3), a data link layer (layer 2) and a physical layer (layer 1). Layer 1, at the bottom of the hierarchy, changes little from protocol to protocol (or between control and user protocol stacks). Layer 1 provides the physical means to implement a connection between a terminal and the telephone central switching office. Layer 1 functions are defined in CCITT (the International Consultative Committee on Telephone and Telegraph) Recommendations I.430 and I.431.

Layer 2 services have typically included insertion and deletion of transmission and receive bits from frames, the interpretation of address and control fields and the generation and interpretation of frame check sequences (relating to error detection and correction). Decisions on whether to establish or disestablish a link to another terminal on a B-channel have occurred at higher layers, typically the application layer.

In one sense, communications over the B-channels are not so much between terminals as between users of the terminals or between applications executing on the terminals. The activities of the lower layers are driven by events at the application layer at the top of each of the user protocol stacks. Communications are required when remote resources are needed to answer a user inquiry or when a message from a user is to go to another terminal. Many applications produce bursty communications traffic, especially interactive applications involving transmission of images. Bursty communications mean that frames are bunched in time. At times a B-channel is busy while at other times the channel is not carrying traffic. However, if the B-channel remains dedicated it is not available for use by another application. Of potentially greater consequence in terms of expense, tariffs imposed by the owner of the public data network accumulate for each B-channel in use.

Tariffs are fees for use for a specific unit of service provided by the telecommunications facility. In North America, fees are imposed for a switched-circuit connection per unit time of connection with a charge for an initial minimum unit. In other words, for an ISDN subscriber, variable fees are imposed for each B-channel when in connection whether carrying traffic or not. No fee is imposed for use of the D-channel. There exists potential for reducing telephone charges to ISDN subscribers if B-channel connection time can be limited to those periods where needed to meet data traffic. However, the existing protocols do not provide such a tool. Further, such a tool would preferably be compatible with existing protocols.

Selective connection to reduce connection costs has been used with unbalanced protocols, i.e. wide area networks where pairs of terminals in communication with one another are in a master-slave relationship. An example of such a system is the X.21 switched network, for which International Business Machines Corporation developed a Short Hold Mode (SHM) protocol. SHM is based upon short connection durations and uses frame formats that combine Systems Network Architecture (SNA) information and connect/reconnect information. SHM procedures are based upon and intertwined with Synchronous Data Link Control (SDLC) procedures. SDLC is a layer 2 protocol that requires communicating devices to be designated primary or secondary. Primary devices than poll secondary devices as a prerequisite to secondary devices transmitting data. In SHM temporary disconnection occurs after a predetermined number of non-productive polls have occurred. It cannot be used in any strategic balanced layer 2 protocol such as CCITT Q.922/IBM IDLC, X.25 HDLC, or IEEE 802.2, which do not normally involve polling. Nor can SHM be used with other high level protocols such as Open Systems Interconnection (OSI).

Before summarizing the invention, three terms used here should be defined. One term is "frame", which is a data structure that consists of fields, determined by the particular protocol, for the transmission of application, control, or user data. A frame is a standardized way of organizing data, which includes areas for insertion of information. A circuit-switched connection is a connection established and maintained on demand between two data stations. A balanced protocol at layer 2 is one where either node in a session may initiate data transmission without any polling.

SUMMARY OF THE INVENTION

It is therefore one object of the invention to provide an improved method of data communications.

It is another object of the invention to provide an improved method of data communications over a wide area network implemented on a telecommunications system imposing tariffs.

It is yet another object of the invention to provide a method of reducing connection costs between nodes of a telecommunications system where the data transmission is intermittent.

The foregoing objects are achieved as is now described. In a wide area network implemented on a circuit-switched public data network, a plurality of terminals have access to a plurality of data channels and a control channel into the wide area network. The invention provides a method for reducing connect time over the data channels between terminals using a balanced protocol. To do this a conversation is established between a transaction program on the local terminal and a transaction program on the remote terminal. A conversation is a relationship between two transaction programs corresponding to a period during which the programs are identified to one another to allow the transparent transfer of data from one to another. Responsive to generation of data for transmission by one of the transaction programs, where no channel connection already exists, lower layers in the network interface establish a channel connection between the terminals where the transaction programs are resident which includes a data channel connecting each terminal into the wide area network. Responsive to expiration of a predetermined period after last transmission or receipt of a frame and existence of the channel connection for a minimum connect period, the channel connection is disestablished without interrupting the conversation between the transaction programs. The predetermined period and the minimum connect period are optimized to minimize costs under a tariff structure for the circuit-switched public data network.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
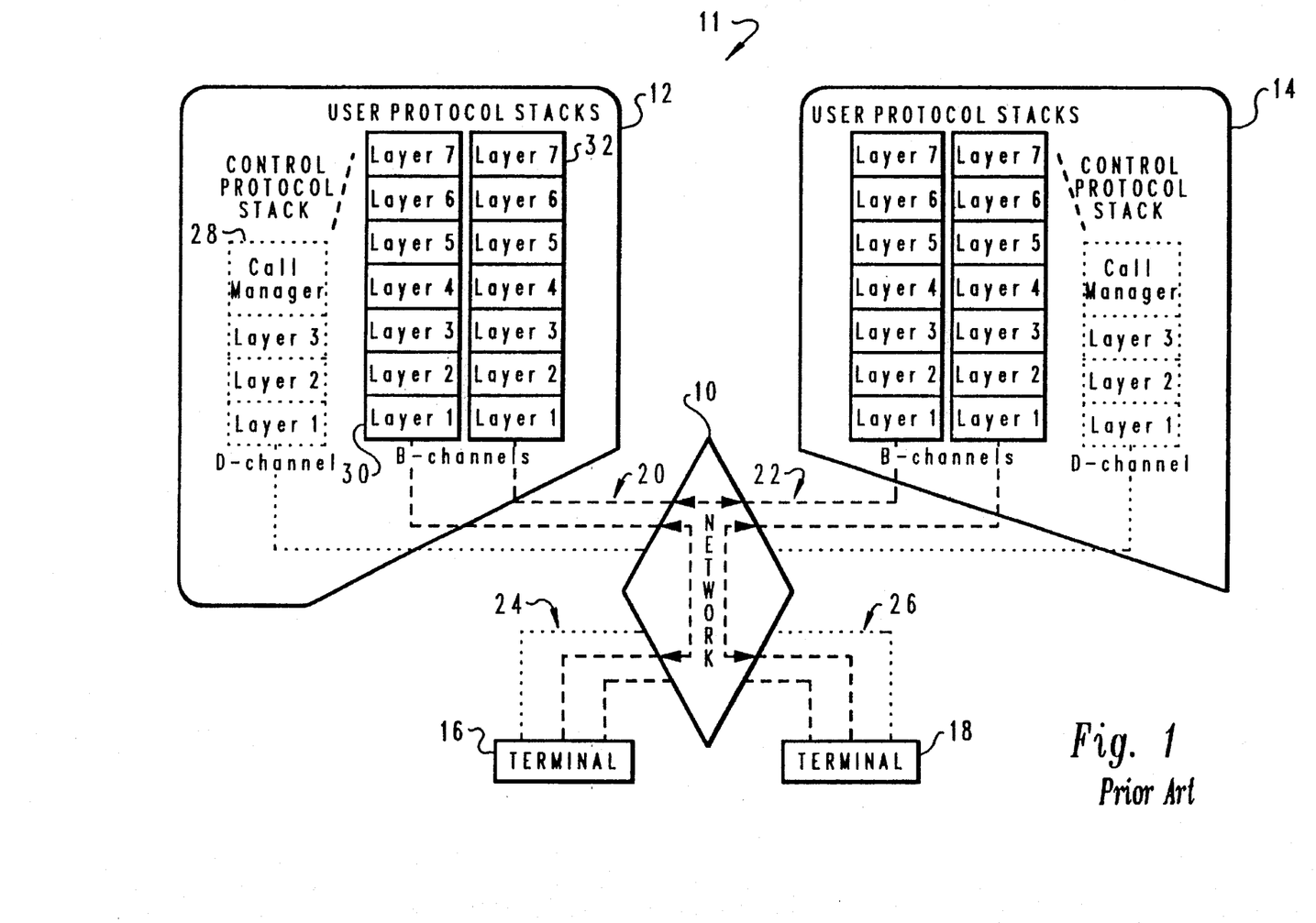
FIG. 1 is a functional high level block diagram of a wide area network.

FIG. 1 depicts a block diagram of a prior art circuit-switched digital data network 10 such as a contemporary telephone network. Network 10 is preferably used to implement the Integrated Services Digital Network (ISDN) service which is a purely digital end-to-end data transmission service. Network 10 is illustrated as providing links to four terminals 12, 14, 16 and 18, although it will be understood that the network may include many more terminals than shown. Terminals 12, 14, 16 and 18 could be processing systems such as PS/2 personal computers available from International Business Machines Corporation or mid-range machines such as AS400 computers also available from International Business Machines Corporation which in combination with the ISDN service are used to implement a wide area network 11. An ISDN input/output adaptor may part of each data processing system.

Terminals 12, 14, 16 through 18 are connected to network 10 by physical links 20, 22, 24 and 26, respectively, each of which links is typically a telephone line modified for transmission of digital data. A plurality of logical channels are supported on each physical link. In the ISDN basic rate this includes one control or D-channel and two data or B-channels, and in the ISDN primary rate this includes one D-channel and up to 30 or more B-channels. Each B-channel carries up 64,000 bits per second. Network 10 tariffs are based upon the duration of channel connections between terminals with a minimum duration charge. A channel connection includes a B-channel from each terminal and a circuit-switched connection through network 10 linking the B-channels. Typically no charges are imposed for traffic on the D-channel. D-channel traffic is control information (e.g. phone numbers) passing between a terminal and control circuitry of network 10. End-to-end connection of B-channels is controlled by traffic on the D-channel.

Terminal 12 illustrates a conceptual division of functions for an ISDN terminal. Functions related to management of logical channels is segregated from functions relating to support of communication between transactions programs. Channel management functions are placed in a control protocol stack 28 comprising a call manager and three functional layers numbered 1 through 3 from the lower to the upper layers in the protocol hierarchy. Layer 1 functions in the control protocol stack 28 are defined in CCITT Recommendations I.430 and I.431. Layers 2 and 3 are defined in CCITT Recommendations Q.921 and Q.931, respectively.

Two user protocol stacks 30 and 32 are shown opened in terminal 12. Each user protocol stack corresponds to a transaction program executing on terminal 12, which is in communication with a transaction program executing on a remote terminal. The transaction program of user protocol stack 30 owns a B-channel over physical link 20 to a transaction program executing on terminal 16. The transaction program of stack 32 owns a B-channel in physical link 20 connected through network to a B-channel in physical link 22 to terminal 14. Another channel connection is shown between terminal 14 and terminal 18.

User protocol stacks 30 and 32 have seven layers each in commonly used communication protocols such as SNA and OSI, although a greater or fewer number of layers is possible. A transaction or application program executes in the highest layer, which is the application layer. Each user protocol stack is rigidly linked with a channel connection, including a specifically assigned B-channel. The number of transaction programs on a local terminal actively linked with transaction programs on other terminals does not exceed the number of B-channels out of the local terminal. Note that the present invention is not concerned with the possibility of multiplexing logical channels within a B-channel, which would enable a plurality of transaction programs on a local terminal to communicate with a plurality of transaction programs on a single remote terminal.

Channel connection and disconnection is carried out by control protocol stack 28 upon request from a transaction program executing on an application layer upon making its user protocol stack 30 or 32 (or any other stack upon its being opened). Upon establishment of a channel connection, control of the B-channel assigned the channel connection is handed over to a lower layer of the user protocol stack. To a transaction program executing at layer 7 of user protocol stack 30 the connection is identified as routing information which is used to assemble a frame of data for transmission. The frame is then passed down the protocol stack to the lower layers where error control data may be attached and the actual physical acts associated with transmitting the data are carried out.

Figure 2:
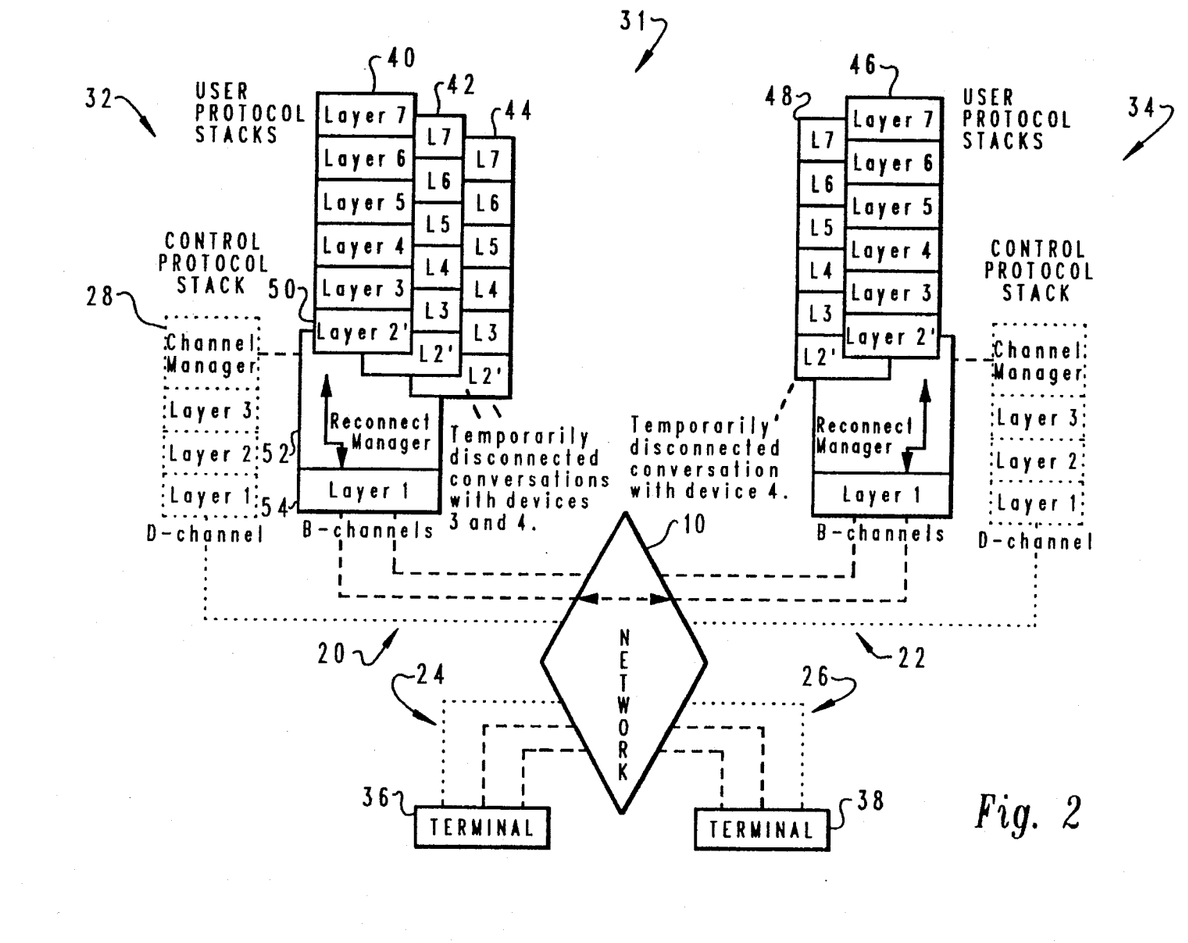
FIG. 2 is a functional high level block diagram of a wide area network in accordance with the invention.

FIG. 2 illustrates a wide area network in which like numerals refer to like components. Wide area network 31 is implemented on a data transmission network 10 having four terminals 34, 36, 38 and 40 modified to implement the present invention. Network 10 provides physical links 20, 22, 24 and 26, respectively to terminals 34, 36, 38 and 40. The modifications to terminals 34, 36, 38 and 40 consist of changes in the network interface protocols of the user protocol stacks. User protocol stacks 40, 42 and 44 are illustrated as opened in terminal 32 and user protocol stacks 46 and 48 in terminal 34. Again each user protocol stack corresponds to a transaction program which can accept or transfer data to an identified transaction program executing on another terminal. However, user protocol stacks are not rigidly associated with a B-channel. Only one B-channel connection is in use, that between user protocol stack 40 and user protocol stack 46. User protocol stacks 42, 44 and 48 all have ongoing conversations, but own no current B-channel connections.

The relationship between mutually remote transaction programs during the period in which they are identified to one another for exchange of data frames is termed a conversation. While it is requisite that a conversation be in existence for every opened user protocol stack, it is not required that a channel connection be made for any user protocol stack. Accordingly, conversations can exceed the B-channels in number.

When a transaction program has generated a frame of data to transmit to a remote transaction program, the frame is passed from layer 7 in user protocol stack 40, 42, or 44 down to layer 2' in the stack. Layer 2' determines if the user protocol stack generating the data has control of a B-channel. Between layer 2' and layer 1 is a reconnect manager 52, to which the transmission request goes if the stack does not have control of a B-channel. As discussed below, reconnect manager 52 will attempt to obtain a channel connection if none is owned by the requesting application.

Figure 3A:
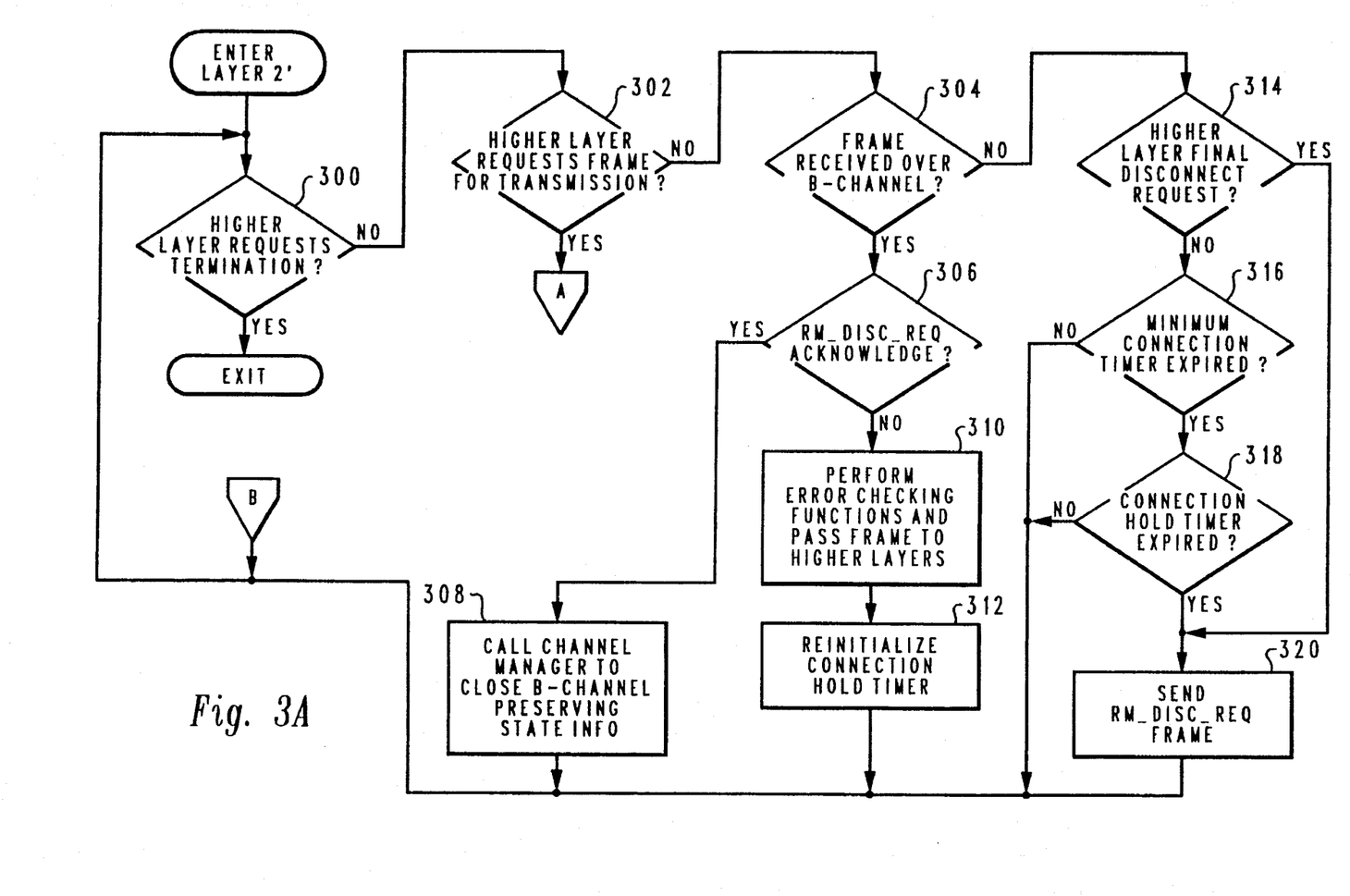
FIGS. 3A and 3B are a high level logical flow chart for a data link layer for a wide area network protocol.

FIGS. 3A and B are a high level logical flow chart of a layer 2' process in a user protocol stack relating to connection management over network 10. In a multitasking environment, a Layer 2' process continues to be scheduled for execution as long as an associated conversation exists. The process is entered with execution of step 300 where it is determined if termination of a conversation has occurred. A layer 2' process is terminated following release of the B-channel connection and the end of a conversation. If termination has not occurred, the NO branch is taken to step 302. At step 302 it is determined if layer 2' has received a higher layer request for a transmission frame on a B-channel. If a frame for transmission of data has been requested the process continues by way of off page connector A to FIG. 3B.

If at step 302 it is determined that a request for a data transmission has not been received, the process continues along the NO branch from step 302 to step 304, where it is determined if a frame has been received from an external source over a B-channel. If such an incoming message as been received the process exits step 304 along the YES branch. Next, step 306 is executed to determine if the incoming frame was an "RM_DISC_REQ_ACK", or an acknowledgement of a request for release of a B-channel while preserving the conversation between application programs executing on the local and the remote terminal. If the frame is such an acknowledgement, step 308 is executed to call the channel manager for release of the B-channel. State information is preserved to keep the conversation open. After return from step 308, processing returns to step 300. If at step 306 the frame was not an acknowledgement of a request to disconnect, the frame is taken to be data. The process takes the NO branch from step 306 to step 310 where normal error checking is performed. After error checking is completed, the frame is passed to the higher layers. Next, with execution of step 312, the connection hold timer is reset. Processing then returns to step 300.

If at step 304 it is determined that no frame has been received over a B-channel, the NO branch is taken to step 314. At step 314 it is determined if a higher layer disconnect request has been received. If such a request has been received, the YES branch is taken to step 320 to send an RM_DISC_REQ frame over the B-channel to the remote process. This is done to warn the remote terminal to preserve state information to preserve the conversation between applications during a period of disconnection.

Where no request for disconnection has been received from a higher layer, such disconnection may still occur in a manner transparent to the higher layers. Where the process follows the NO branch from step 314 to step 316, it is determined if a minimum connection timer has expired. If the timer has not expired processing is returned to step 300. If the minimum connection timer has expired, step 318 is executed to determine if a connection hold timer has expired. If this timer has not expired, processing is returned to step 300. If however, both timers have expired, step 320 is executed to release the B-channel.

The minimum connection timer and the connection hold timer measure the time since the B-channel connection was initiated and the time since the last data traffic over the channel, respectively. Any B-channel connection, once made, is held for a minimum period. If data traffic is then so intermittent that the connection hold timer expires, the B-channel connection is released. The invention is intended for applications characterized by bursty demands for data transmission. In other words, an application where data frames tend to bunched in time. The connection hold period is selected to catch, within a reasonable level of assuredness, all data frames in a "bunch", while minimizing expected connection charges. The precise period selected will depend upon the network tariff structure, charge rates and data transmission characteristics of the application.

Figure 3B:
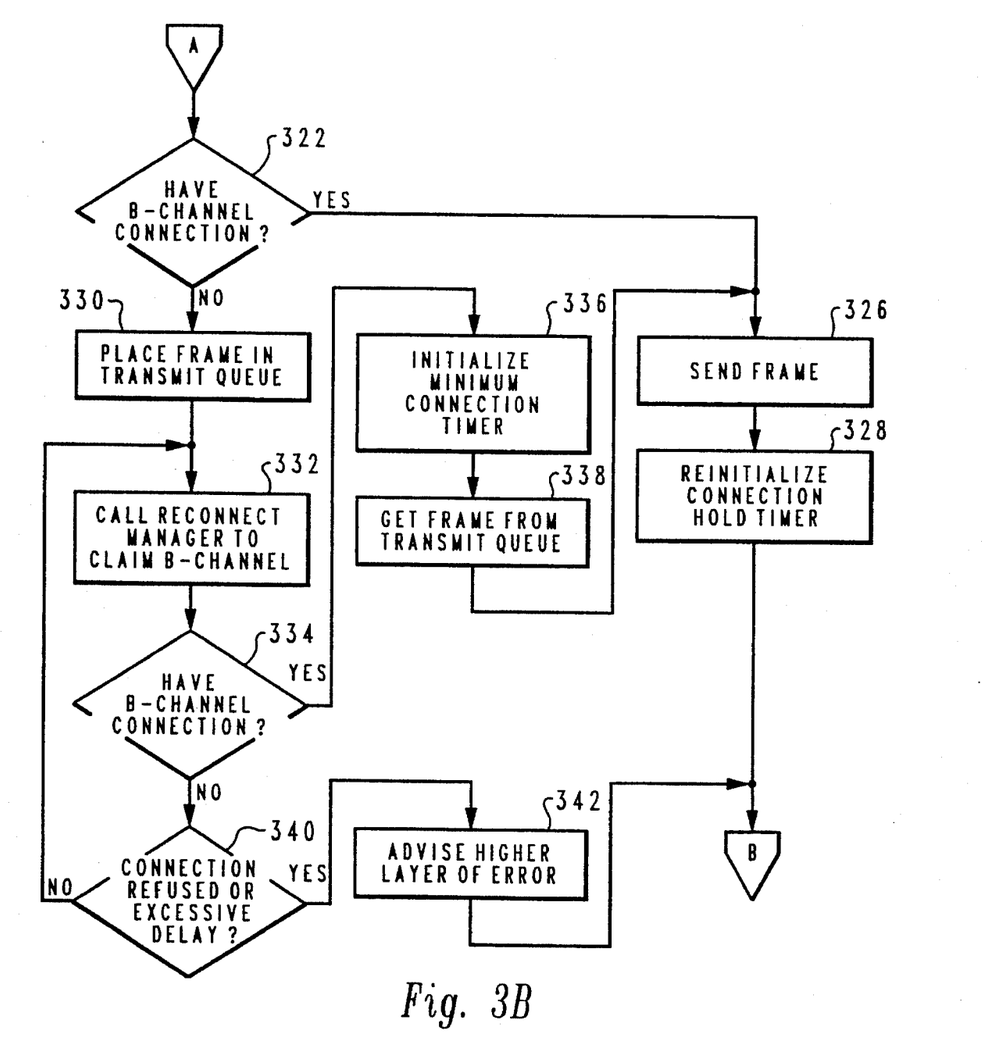

FIG. 3B is the part of a layer 2' process used when data is ready for transmission to a remote process. Processing is routed through the portion of the layer 2' process depicted in the figure when it is determined at step 302 of FIG. 3A, that a frame for transmission has been received from a local higher layer, whether or not a conversation already exists. At step 322 it is determined if a B-channel connection is in place for an existing conversation. If a B-channel is on line, processing follows the YES branch to step 326, where the frame is sent. Transmission of a frame will be understood to include addition of the usual error checking data and routing duties of a layer 2. After transmission of a frame the connection hold timer is reinitialized. Processing then returns to step 300 via connector B.

When data is ready for transmission, but no B-channel connection is held by the layer 2' process, the NO branch is followed from step 322 to step 330, where the data frame is placed into a transmit queue. Next, at step 332 the Reconnect Manager is called to obtain a B-channel connection for transmission of the frame. After control is returned to the layer 2' process, step 334 is executed to determine if control of a B-channel was also returned. Following the YES branch, indicating a B-channel connection, step 336 is executed to initialize a minimum connection timer. At step 338 the frame is recovered from the transmit queue. Processing thereafter continues with step 326, as described above.

If at step 334 it is determined that control over a B-channel connection was not returned by the reconnection manager, step 340 is executed to determine if connection was refused or if excessive delay has been incurred. If connection has not been affirmatively refused and excessive time has not been expended, connection is reattempted by returning processing to step 332. Where the delay in obtaining connection is excessive, or has been affirmatively refused, step 342 is executed to advise higher layer of the error condition. Processing is returned by connector B to step 300.

Figure 4A:
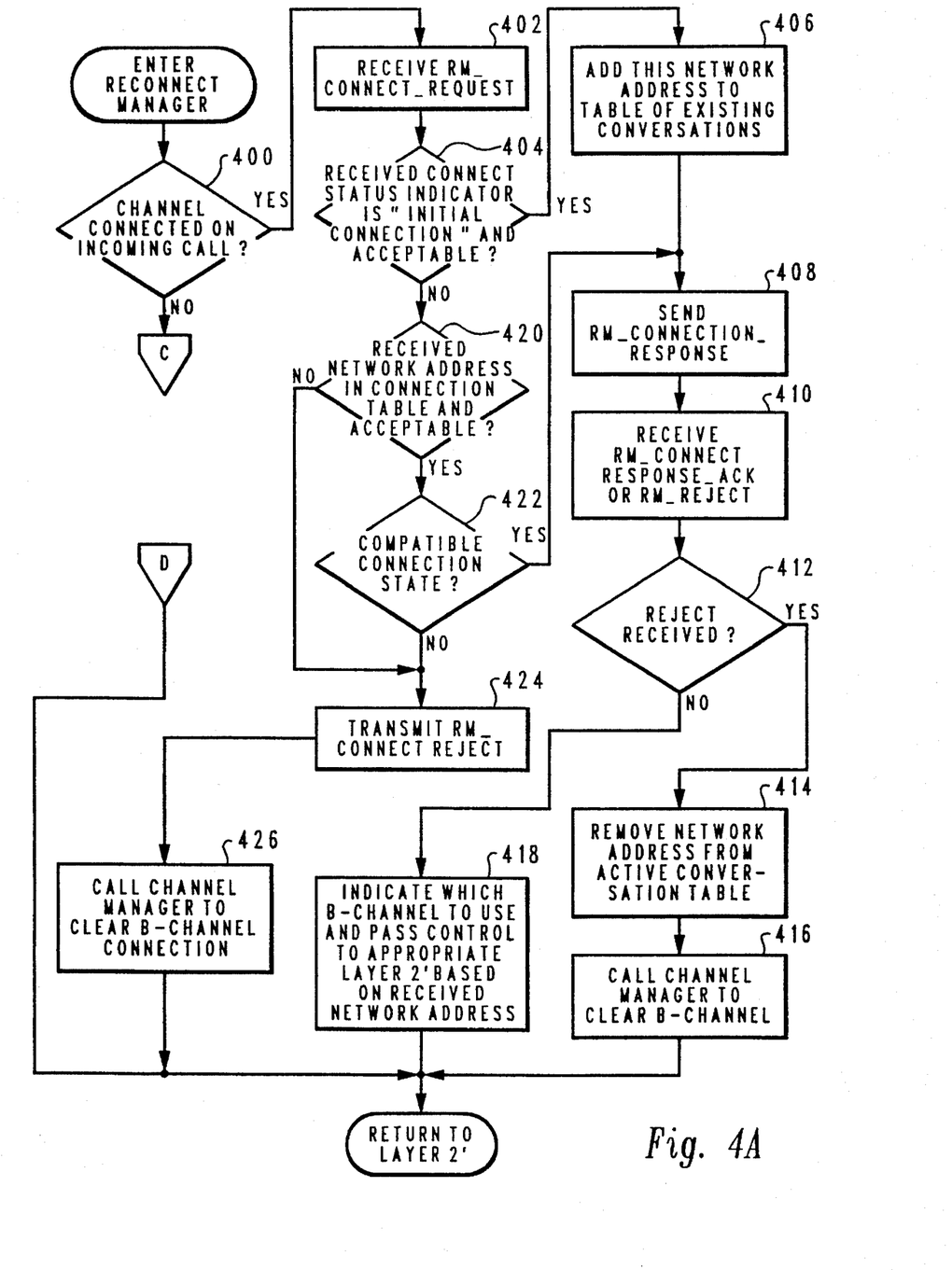
FIGS. 4A and 4B are a high level logical flow chart for a channel reconnect manager process for a terminal in a wide area network.
Figure 4B:
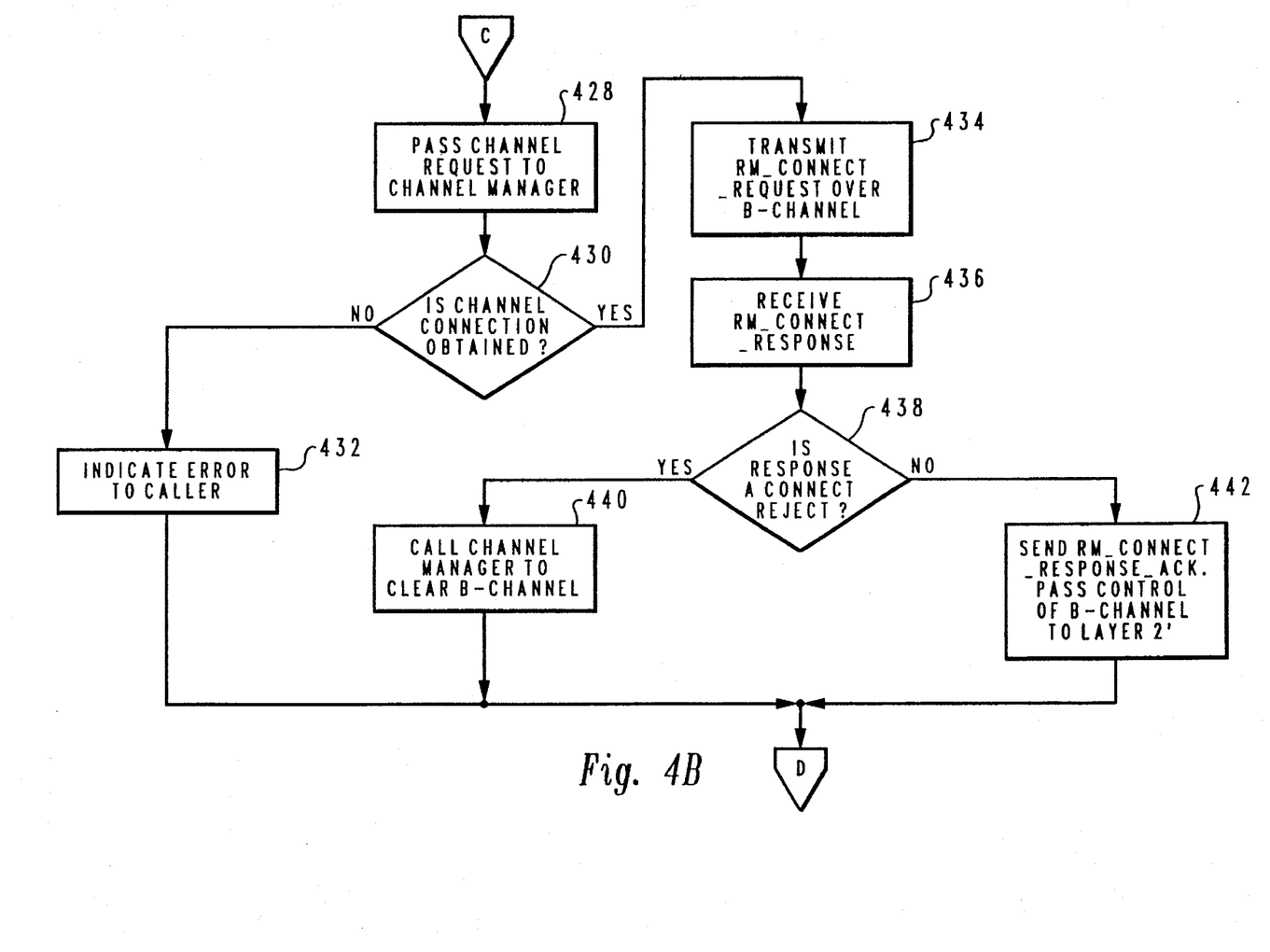

FIGS. 4A and 4B depict a logical flow chart of processing in the Reconnect Manager. The process is entered with execution of step 400, where it is determined if the reconnect manager process was entered as a result of answering an incoming call. Following the YES branch, step 402 indicates reception of an RM_CONNECT_REQUEST over the B-channel. Steps must now be taken to determine if a local process is in a conversation with a remote process on the terminal initiating the call. Step 404 is then executed to detect the presence of a status indicator for an initial connection request, i.e. a request to set up a conversation where none exists, and acceptance of connection on the part of its local higher layers.

Where both an initial connection status indicator is present and connection to higher layers is accepted, processing follows the YES branch from step 404 to step 406, where a network address from the incoming call is added to a table of existing conversations. Next, step 408 is executed to send an RM_CONNECTION_RESPONSE back to the terminal originating the call. An RM_CONNECTION_RESPONSE_ACK (essentially an acknowledgment of synchronization of the applications) or RM_REJECT (inability to continue the connection) will be returned by the remote terminal for reception (step 410). With step 410 the reconnect manager may run a timer while waiting for a response. If the timer expires, or if a normal protocol frame is received instead, the device assumes that an acknowledge was sent but lost due to line noise and proceeds as if the acknowledge had been received. Detection of return of an acknowledge or a rejection is carried out at step 412. If connection is rejected, steps 414 and 416 are executed to remove the network address from the active conversation table and to call the channel manager process to clear the B-channel. Processing is then returned to the Layer 2' process. If the acknowledge signal was received at step 410, the NO branch is followed from step 412. Step 418 is then executed to indicate to layer 2' which B-channel to use and to pass control to the appropriate layer 2' process based upon the received network address.

We shall now consider the response to the situation where reconnection of an existing conversation is being attempted, or where an initial connection could not be granted. Following the NO branch from step 404 to step 420, it is determined if the received network address is in the table of existing conversations. If it is not, the conversation cannot be continued. The NO branch is followed under these circumstances, or where connection was refused by a higher layer for any reason. Step 424 is then executed to transmit an RM_CONNECT_REJECT and with execution of step 426 the channel manager is called to clear the B-channel. If, on the other hand, the received network address was present at step 420, and higher layers can accept reconnection, the YES branch is followed to step 422 where it is determined if a compatible connection state exists (e.g. state information has been preserved which will not be the case if the local application has been discontinued or interrupted). If compatible connection states exist, processing follows the YES branch to step 408 and processing continues as described above. If connection information is incompatible, processing goes on to step 424 as described above.

FIG. 4B depicts that portion of the reconnect manager process relating to obtaining a B-channel for outbound data. Entered at step 428 from connector C, the channel request is passed to the channel manager (described below). Upon the return of processing from the channel manager, step 430 is executed to determine if a channel connection has been obtained. If no channel has been obtained, step 432 is executed to pass an error indication to higher layers. Where a channel has been obtained, step 434 is executed to transmit an RM_CONNECT_REQUEST over the B-channel. Upon receipt of a response back over the B-channel (step 436), step 438 is executed to determine if the response was one of acceptance or rejection. For robustness, the reconnect manager may run a timer while waiting for an RM_CONNECT_RESPONSE. If the timer expires, an additional request may be sent. After a predetermined number of failed retries, or if an unexpected frame is received, the situation is treated as rejection of connection. If a rejection, step 440 is executed to call the channel manager to clear the B-channel. If an acceptance, step 442 is called to send an RM_CONNECT_RESPONSE_ACK (if approved by local higher layers to the layer 2' process) and to pass control of the B-channel to the appropriate layer 2' process. Processing in all events is returned to the layer 2' process.

Full description of the error checking has been omitted from the above description for the sake of clarity of description of the fundamental invention. Frames involved in the exchange that begins the verification of connection, i.e. the RM_CONNECT frames, have a format that includes the following fields. A primitive code specifies whether the frame is a request frame, a response frame, a reject frame or an acknowledge frame. A connection status indicator states whether the frame is for a connection or a reconnection. The reconnect manager tests the connection status indicator for state compatibility. If the reconnect manager detects that one side of the conversation was reset during a period of disconnection, a reject frame is sent in response to a request frame. A network address format is sent in another field. The network address includes the sender's full phone number. A connection ID may be included for improved performance. In the frame exchange that occurs upon initial connection, each reconnect manager sends a connections ID, typically an address of a control block containing information about the connection. Received connection IDs are saved for sending upon attempts at reconnection. In the frame exchange that occurs upon reconnection, each reconnect manager sends the saved connection ID. This provides addressability to information needed to continue the conversation. This is more efficient than using the received network address as an index. A cause field giving a coded reason for refusal of connection may be part of the rejection frame. Frame content is independent of higher layer protocols. It may be sent in the information field of a high-level data link control field (HDLC). If HDLC is used, the frame header may include an HDLC address, which is the same as conventional layer 2 protocol frames, and an HDLC control field-unnumbered frame, such as unnumbered information or exchange identification.

Figure 5:
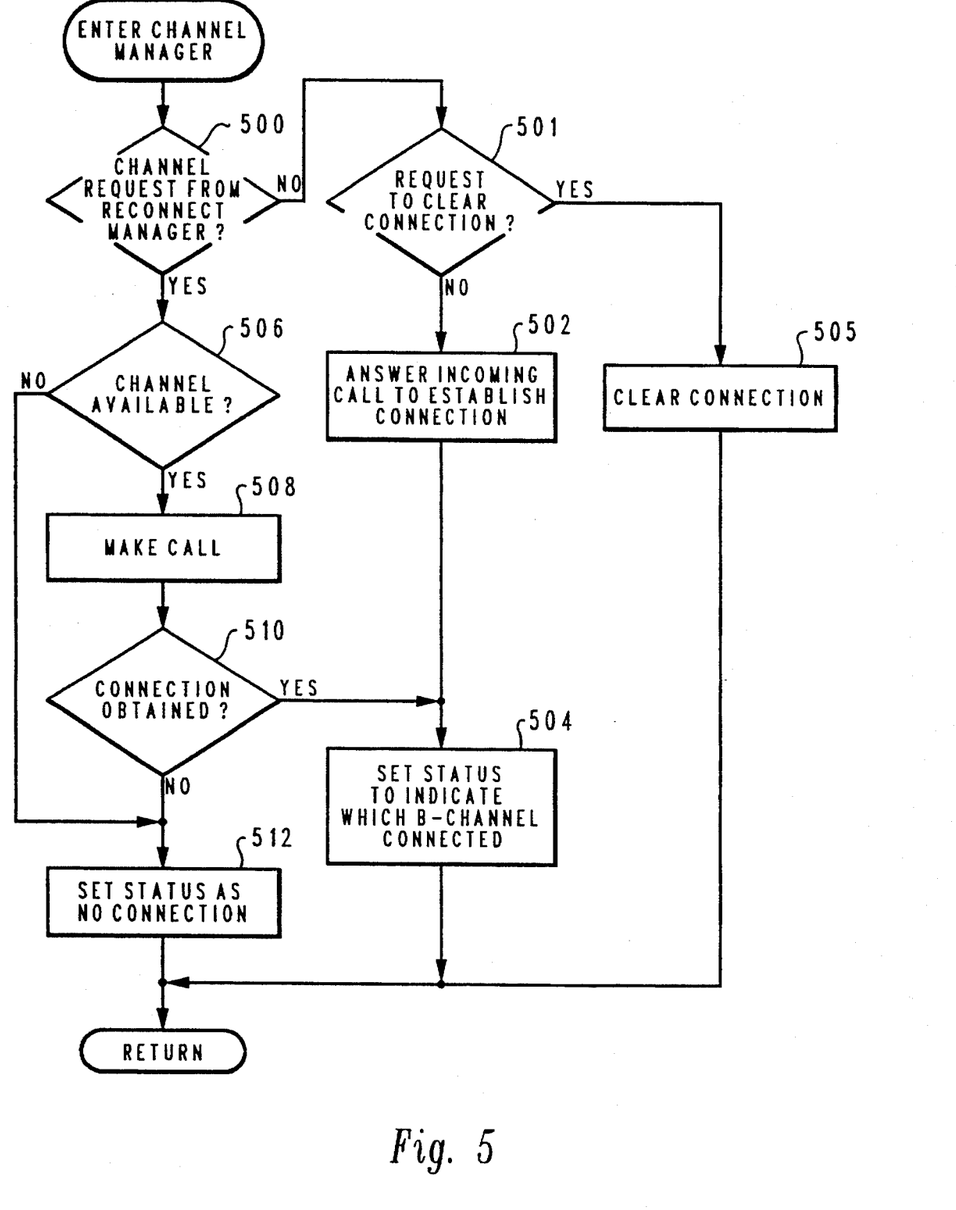
FIG. 5 is a high level logical flow chart for processes which are part of a digital data channel manager for a wide area network.

FIG. 5 depicts a high level logical flow chart of a channel manager. The channel manager is entered with execution of step 500. In step 500 it is determined if a channel request has come from the local reconnect manager. If no channel request is pending, step 501 is executed to determine if a request to clear connection has been received. If not the channel manager is answering an incoming call from over the network. Step 502 is then executed to answer the call. Next step 504 is executed to set status to indicate which B-channel is connected and processing is returned to a local application in conversation with the caller. If at step 510 a request to clear connection was received, step 505 is executed to clear the connection.

If a channel request was the cause of entry to the channel manager the NO branch is followed from step 500 to step 506 where it is determined if an outbound B-channel is available. If none is available, processing skips to step 512 where status is set to no connection. Processing returns to the reconnect manager for a possible retry. If a channel is available, the YES branch is followed form step 506 to step 508 where the remote terminal is called over the D-channel. At step 510 it is determined if a connection has been obtained. If yes, step 504 is executed to pass control of the channel connection to the reconnect manager for verification that the remote terminal can accept the connection. If no connection is obtained, possibly because the line was busy, step 512 is executed to set status to indicate no connection. Processing is then returned to the calling process.

Figure 6:
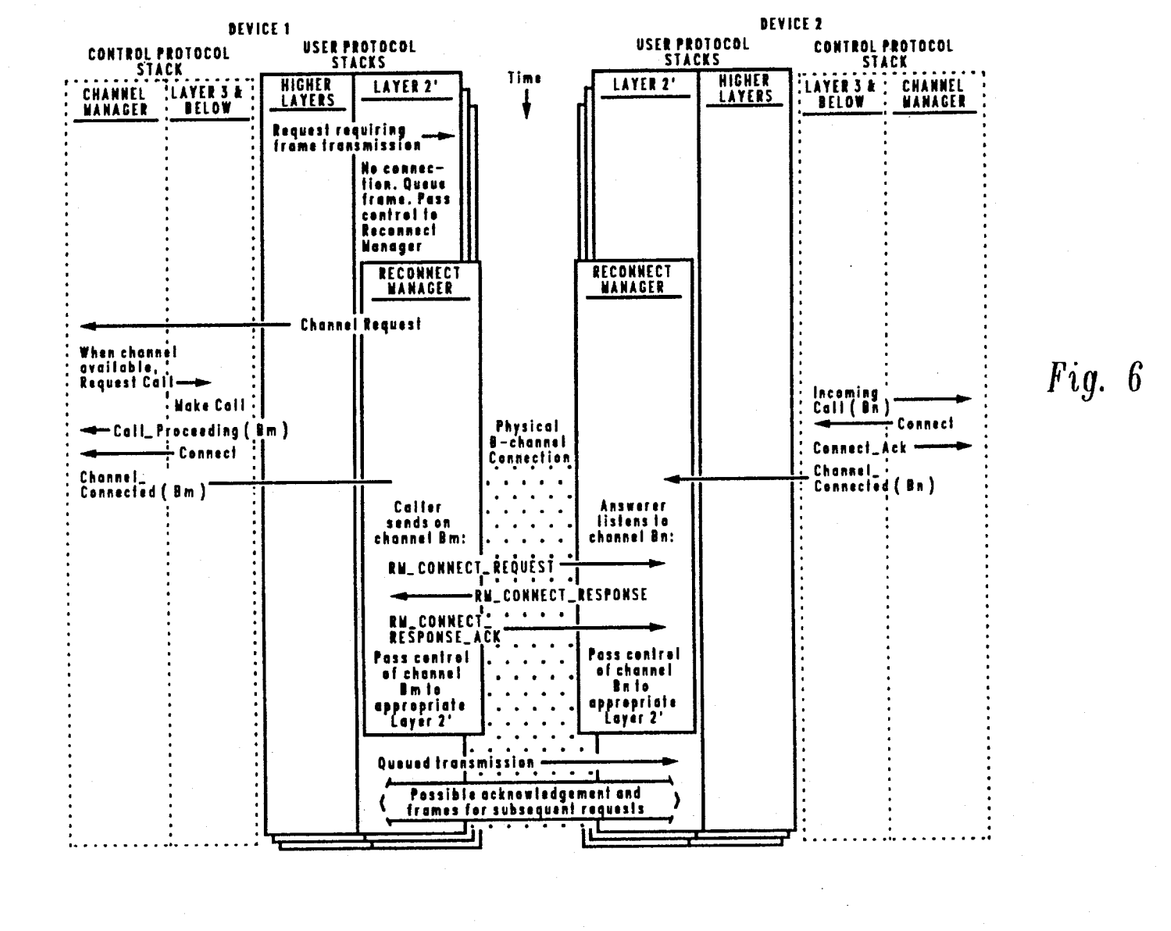
FIG. 6 is a timing chart illustrating relationships between processes within the data link layer, the reconnect manager and the digital data channel manager.

FIG. 6 depicts timing relationships between Layer 2', the reconnect manager and a channel manager. Time progresses from top to bottom of the diagram. The chart reflects a request for transmission of a data frame originating in a user protocol stack of device 1. The request is transmitted from a higher layer to Layer 2', which, because no channel connection is available, passes the request and control to its reconnect manager. The reconnect manager passes the request over the control protocol stack. The request is received in the channel manager, which in cooperation with lower layers of the control protocol stack makes a call to remote terminal. Upon obtaining a channel connection, control of the channel is returned to the reconnect manager. Simultaneously, the remote channel manager awakes the remote reconnect manager and similarly passes control to it. The reconnect managers use the channel connection to carry out a dialogue to determine if the remote terminal can accept connection on the basis requested by the local terminal. If yes, states are synchronized and control passes to the respective Layer 2''s. Exchange of data frames may then proceed.

The temporary B-channel disconnection procedure of the present invention does not depend upon Layer 2 polling, and thereby makes the process applicable to more protocols, including particularly balanced layer 2 protocols. In balanced protocols, the absence of polling allows data to be moved at a given channel utilization with less processor utilization, or allows support of more channels at a given processor utilization. Balanced protocols are inherently full duplex, whereas other protocols are half bandwidth. Thus balanced protocols offer twice the bandwidth to applications. CCITT Q.922 is directly compatible with frame relay networking, which is a rapidly emerging routing method expected to provide significant tariff advantages to North American users in the late 1990's and early 21st century.

While the invention has been particularly shown and described with reference to a preferred embodiment, it will be understood by those skilled in the art that various changes in form and detail may be made therein without departing from the spirit and scope of the invention.

What is claimed is:

1. In wide area network implemented on a circuit-switched public data network, wherein a plurality of terminals have access to a plurality of data channels and to a control channel into the wide area network, a method of managing connection between a pair of terminals over one of a plurality of data channels comprising the steps of:

establishing a conversation between a transaction program on a local terminal and a transaction program on a remote terminal;

responsive to generation of a frame for transmission by the transaction program on the local terminal to the transaction program on the remote terminal, establishing a channel connection between the local terminal and the remote terminal for the conversation in a balanced protocol including a data channel connecting each terminal into the wide area network if no channel connection is already established for the conversation;

transmitting the frame over the channel connection;

determining if the channel connection has been established for a minimum connect period; and thereafter, responsive to expiration of a predetermined period after last transmission or receipt of a frame, disestablishing the channel connection without interrupting the conversation between the transaction programs.

2. A method as set forth in claim 1, and further comprising:

optimizing the predetermined period and the minimum connect period to minimize costs under a tariff structure for the circuit switched public data network.

3. A method as set forth in claim 2, and further comprising:

giving authority to the local terminal or the remote terminal for disestablishing the channel connection to the terminal which was the last to receive a frame.

4. A method as set forth in claim 2, and further comprising:

giving authority for disestablishing the channel connection to the terminal which initiated the channel connection.

5. A method as set forth in claim 2, and further comprising:

giving authority for disestablishing the channel connection to a terminal controlled by a party paying for the channel connection.

6. A method as set forth in claim 1, and further comprising:

allowing a plurality of simultaneous channel connections;

establishing a plurality of conversations exceeding in number the number of simultaneous channel connections; and establishing a channel connection for a conversation on any data channels that become available.

7. A method is set forth in claim 6, wherein each channel connection utilizes a hierarchically arranged protocol stack of multiple layers and wherein the step of establishing a channel connection occurs at a data link layer without higher level protocol information.

8. A wide area network comprising:

a plurality of terminals;

a terminal to terminal digital data transmission service implemented on a circuit-switched public data network providing a digital data link from each terminal into the circuit-switched public data network;

means within each terminal for multiplexing a control channel and at least two data channels onto each digital data link;

network interface means within each terminal for establishing a conversation between transaction programs executing on different terminals during which the two transaction programs are identified to one another for transfer of frames of data to one another;

balanced protocol lower level network interface means within each terminal responsive to generation of a frame of data for transmission by one of the transaction programs during a conversation where no channel connection exists for the conversation for establishing a channel connection between the terminals for the conversation;

means within each terminal responsive to receipt of a frame for the conversation by a first of the two terminals after transmission of a frame for the conversation from the first terminal for taking authority for the first terminal to disestablish the channel connection between the terminals; and means within each terminal responsive to expiration of a predetermined period after last transmission or receipt of a frame of data and existence of the channel connection for a minimum connect period for disestablishing the channel connection without interrupting the conversation between the transaction programs.

9. A wide area network as set forth in claim 8, and further comprising:

a plurality of data channels;

means within each terminal for establishing a plurality of conversations exceeding in number the number of data channels; and the means for establishing channel connections being responsive to availability of a given data channel for establishing the channel connection using the given data channel.

10. A wide area network as set forth in claim 8, and further comprising:

means for exchanging frames on the channel connection to eliminate data traffic on the channel connection to allow disestablishing a channel connection.

\* \* \* \* \*